United States Patent [19]
Olesen

[11] Patent Number: 6,098,932
[45] Date of Patent: Aug. 8, 2000

[54] MOUNTING APPARATUS FOR PIPES AND OTHER ARTICLES AND METHOD OF MANUFACTURING THE SAME

[75] Inventor: John Olesen, Frederikshavn, Denmark

[73] Assignee: Roblon A/S, Frederikshavn, Denmark

[21] Appl. No.: 09/121,483

[22] Filed: Jul. 23, 1998

[30] Foreign Application Priority Data

Jul. 24, 1997 [DE] Germany .......................... 197 31 946

[51] Int. Cl.[7] ................................................. F16L 3/08
[52] U.S. Cl. .......................................... 248/65; 24/16 PB
[58] Field of Search ................................. 248/65, 58, 62, 248/68.1, 74.1–74.3, 499, 505, 510, 67.7, 72, 60–61; 24/298, 300–302, 68 R, 19, 333, 339, 343, 16 PB, 68 CD, 17 B, 17 AP; 428/74, 68, 294

[56] References Cited

U.S. PATENT DOCUMENTS

| | | | |
|---|---|---|---|
| 662,935 | 12/1900 | Hibberd | 248/74.1 |
| 1,362,244 | 12/1920 | Farley | 248/62 |
| 1,455,612 | 5/1923 | Heeter . | |
| 1,466,292 | 8/1923 | Bell | 248/58 |
| 1,986,861 | 1/1935 | Starr | 248/62 |
| 2,003,159 | 5/1935 | Taylor | 248/62 |
| 2,870,501 | 1/1959 | Combs et al. . | |
| 2,922,733 | 1/1960 | Henning | 248/74.3 |
| 3,263,947 | 8/1966 | Kertunen . | |
| 3,391,050 | 7/1968 | Nebesar | 428/220 |
| 3,466,219 | 9/1969 | Schwartz | 428/68 |
| 3,475,264 | 10/1969 | Donaldson | 24/16 PB |
| 3,494,849 | 2/1970 | Hess | 248/74.3 |
| 3,622,429 | 11/1971 | Kippan | 161/60 |
| 3,668,740 | 6/1972 | Pearson . | |
| 4,018,015 | 4/1977 | Swanson | 52/23 |
| 4,130,686 | 12/1978 | Takahashi et al. | 428/294 |
| 4,273,476 | 6/1981 | Kotulla et al. | 405/258 |
| 4,318,518 | 3/1982 | Davis | 248/74.3 |
| 4,595,450 | 6/1986 | Pike | 156/500 |
| 4,606,687 | 8/1986 | Mantela et al. | 410/23 |
| 4,769,875 | 9/1988 | Hartman | 24/300 |
| 4,960,253 | 10/1990 | Perrault et al. | 248/72 |
| 4,999,980 | 3/1991 | McGowan | 54/23 |
| 5,522,571 | 6/1996 | Simmons | 248/62 |

FOREIGN PATENT DOCUMENTS

| | | | |
|---|---|---|---|
| 1853241 | of 0000 | Germany . | |
| 1926532 | of 0000 | Germany . | |
| 1951364 | of 0000 | Germany . | |
| 7226076 | of 0000 | Germany . | |
| 19522014 A1 | 1/1997 | Germany . | |
| 0307583 | 1/1998 | Japan | 248/65 |

*Primary Examiner*—Anita M. King
*Assistant Examiner*—Michael Nornberg
*Attorney, Agent, or Firm*—Howard & Howard

[57] ABSTRACT

A mounting apparatus for pipes and the method which enables the reliable attachment of pipes while offering corrosion protection. The mounting apparatus includes a plurality of fused together bands having a thermoplastic coating. Each band includes a plurality of adjacently disposed strings of various load-carrying filaments. The bands each have a thermoplastic coating thereby preventing corrosion where the thermoplastic surface lies against the pipe. By providing strings composed of fibers having different characteristics the bands are particularly tailored to a desired mounting application.

19 Claims, 3 Drawing Sheets

MOUNTING APPARATUS FOR PIPES AND OTHER ARTICLES AND METHOD OF MANUFACTURING THE SAME

BACKGROUND OF THE INVENTION

The present invention relates to a mounting apparatus for pipes, and more particularly to a mounting apparatus having a plurality of bands having a thermoplastic coating.

Common mounting apparatuses are known which serve to mount a cable to a wall and which do not have to bear any particular forces. There are, however, other applications in which the mounting apparatuses have to bear considerable forces and in which special requirements exist with reference to corrosion protection.

A requirement of this kind is to be found in offshore oil and gas production. Pipes having diameters of the order of magnitude of 50 cm must be secured to drilling rigs, platforms, ships and foundations which lie deep below the water surface.

The reliable attachment of such pipes to supporting structures is problematic and frequently carried out by means of iron or steel hoops. However, subsequent surface treatment of the pipes fails to include the regions where the pipe hoop contacts the pipe surface. The pipes will thus corrode due to the moist environment and diverse metals.

U.S. Pat. No. 3,668,740 discloses a high strength, non-corrodible strap of composite materials, which is intended for anchoring underground storage tanks on foundations to prevent them lifting due to buoyancy forces when the tank is partly or fully empty. The strip is manufactured by drawing structural members, such as glass filaments, through a pot containing a duroplastic resin, such as polyester, bisphenol, or epoxy resins. The resin impregnated filaments are then wound into a continuous or endless band. The number of revolutions required is determined by the desired strength of the finished strap. For example, a strap of 44 mm width and 6.25 mm thickness can be wound with twenty revolutions of a bundle of glass filaments to provide a tensile strength of 20,000 pounds. The length of the finished strap is determined by the distance between the axially directed winding fingers of a winding apparatus. The axially directed fingers are adjustable along radially directed arms of the winding apparatus to vary the size of the loop used to form the strap.

After the desired number of revolutions have been made, the winding apparatus is stopped and the advancing resin impregnated filaments are severed from the wound continuous band. The loose end is then pressed into the uncured resin of the wound continuous band where it is integrated into the matrix. The wound continuous band, together with two thimbles for the eyes of the finished strap, are removed from the winding apparatus and placed on a mould table. The two opposite sides of the wound continuous band are pressed together on the mould table to form an elongate strap with two eyes and the formed strap is left in the mould until the resin cures into a hard matrix.

U.S. Pat. No. 3,668,740 also specifies that the strap can also be produced by winding the filaments into the desired loop shape and then impregnating the assembled elements with resin to form the matrix of the strap construction. The impregnating resin can be applied by such methods as spraying, dipping, or injecting into a mould.

In addition to these methods of producing a wound filament strap, other structural member can be produced with reinforcing filaments extending basically longitudinally and continuously from one end of the member to the other, but not looping. The resinous matrix can be applied either by advancing the bundle of filaments through a pot of resin or impregnating after the filaments have been placed into the desired configuration. It is to be noted that this invention is not limited to the use of filaments in the form of rovings, but also contemplates the use of strands, yarns, or woven filaments.

While glass filaments and polyester resin are the preferred constituents used for the straps of U.S. Pat. No. 3,668,740, it is obvious to one skilled in the art that other materials can be readily substituted. The reinforcing material can be of any high tensile strength filaments of materials such as carbon, nylon, rayon, and metals. The matrix of the strap can be made from any abuse-resistant material such as epoxy resins, vinyl, and rubber, as long as it is compatible with the reinforcing filaments. The matrix material can be selected to give particular desired effects. A soft, resilient material such as rubber could be used to form a matrix with the ability to firmly grip the object to be secured by the strap through the frictional advantages gained by compressing the matrix against the object. The advantages of such a strap would be useful in securing an object, such as a tank, against rotation when subjected to motion such as occurs aboard a ship. Other possible desired effects, such as extensibility, can be had by using the construction form of this invention with elastomeric matrix materials and reinforcing material having a high coefficient of expansion or extensibility created by twisting the filaments.

The construction described in U.S. Pat. No. 3,668,740 are, however, all very complicated, difficult to realize, and subject to significant restrictions. For example, if a winding apparatus is used, it has to be designed for a maximum circumferential length of the wound band and cannot be used for greater circumferential lengths. The curing of the thermoplastic resin presents problems not just in the finished article but also in the resin impregnating apparatus. Moreover, there are considerable difficulties in handling the resin impregnated filaments, which severely restricts the products which can be made from them.

German Patent Application 195 22 014 A1, discloses the use of flexible bands consisting of a high modulus grid fabric of polyester yarns which are coated with a protective layer of PVC. The bands can be used to interconnect a plurality of pipelines extending parallel to one another by wrapping the band once around each pipeline in turn and anchoring the two free ends of the band in the earth by means of holders.

SUMMARY OF THE INVENTION

The present invention provides a mounting apparatus which enables a reliable attachment of pipes while offering corrosion protection. Furthermore, the present invention provides an extremely flexible method of providing a wide variety of different mounting apparatuses from a single starting material, which can itself be economically produced.

The present invention comprises a plurality of fused together bands each comprising at least one string, and preferably a plurality of adjacently disposed strings of load-carrying filaments. The bands each have a thermoplastic coating, prefferably a thermoplastic resin coating.

The mounting apparatus provides that at least the side of the structure confronting the pipe is covered by a thermoplastic resin. In particular, the bands comprise strings which each have the form of a twisted yarn, rope, or cable. Such bands are known per se. They are, for example, sold by the company Roblon A/S (P.O. Box 120, 9900 Frederikshavn, Denmark) under the designation "orbit straps". They consist, as a rule, of several strings or cables of aramide fibers, with a plurality of adjacently disposed string being jointly covered with a thermoplastic polyurethane. These bands are used in the offshore oil production as strapping for buoyancy modules and has become increasingly used in deep waters.

Thus, in accordance with the present invention, a plurality of bands or band lengths each having a thermoplastic coating are placed together, preferably in a shaped mould, and heated so that the thermoplastic coatings fuse together. The result is a structure which is of stable shape, but has a flexible skin to provide sealing when in contact with a pipe or article when the structure is stressed. The different layers each comprising one band, or a plurality of bands laid side by side, cooperating to provide the net strength to the apparatus. Moreover, the structure can itself be entirely flexible so that it can conform to a desired shape.

A preferred method of manufacturing a mounting apparatus in accordance with the present invention provides a plurality of bands or band lengths, each having respective strings of load-carrying members consisting of filaments and a thermoplastic resin covering. The members are introduced into a mould and are heated in the mould to a temperature which corresponds to the softening temperature of the thermoplastic resin and are pressed together in the mould. The temperature of the so formed moulded part is cooled at least preferably to beneath the softening temperature and the part is subsequently removed from the mould.

It will be seen that the basic building block of the invention is thus a finished band comprising a plurality of parallel, load carrying members which are enclosed in and fully surrounded by a thermoplastic covering. Such a band can be made efficiently in very long lengths, essentially as an endless band.

A large variety of different structures can then be formed in any desired dimensions or strengths by placing lengths of band alongside one another and/or on top of one another. The band lengths can be placed in strategic positions to produce local stiffening or reinforcing by increasing the number of band lengths in regions where enhanced bending stiffness is required.

The handling of the band lengths is straight forward. The bands are present in a cold non-sticky form and are not heavy. They are flexible and can be easily laid up in a mould. Once the structure has been laid up, the temperature is increased to the resin softening point and the application of pressure is sufficient to form a fully fused structure, without loss of positioning accuracy of the individual strings. The fused thermoplastic coatings coupled with the form locked, i.e. keyed bond of the thermoplastic resin to the surfaces topology of the strings. The strings are preferably of twisted multi-ply yarns, rope, or cable, providing enormous shear areas. Load sharing between the bands and individual strings further increases cohesion of the structure.

In one form the mounting apparatus of the present invention can comprise one folded together band with just one string or load-carrying member consisting of filaments. A plurality of bands or band lengths is preferably used, each consisting of a plurality of strings arranged alongside one another in one layer and each comprising load-carrying members consisting of filaments. Optionally, spacers are arranged between the strings, with the strings and spacers being secure to one another by means of the thermoplastic resin. The spacers can, for example, comprise strings of filaments having a lower strength in comparison to the load-carrying filaments. Full jacketing of the strings is preferred, as these are then protected from all sides.

When a mounting apparatus of this kind is used for the mounting of pipe and other articles, the relatively soft thermoplastic resin nestles closely against the pipe or other article to be secured. As a result of the mounting forces which are introduced via the anchoring device into the band a sealed connection is provided between the band and the corresponding surface of the pipe or of the article, which prevents corrosion at this point. Since the mounting apparatus does not consist of metal, the danger of an electrolytic corrosion process does not exist.

It is particularly favorable if the mounting apparatus consists of at least two bands arranged above one another, held together by the thermoplastic covering. A mounting apparatus with at least three bands arranged above one another is particularly preferred, with the band or bands which form the middle layer consisting partly of filaments which have a low strength in comparison to the filaments of the load-carrying members.

A mounting apparatus of this kind can be produced by laying lengths of a corresponding number of bands above one another in a mould, which, for example, has a U-shape matched to the profile of the pipe to be secured. The mould is then heated to a temperature which corresponds to the softening temperature of the thermoplastic material that is used. The bands are simultaneously pressed together by the exertion of pressure onto one or more mould parts. The thermoplastic coverings of the bands thereby enter into an intimate connection with one another. This type of fusing leads to a unitary component which has excellent mechanical characteristics.

Through the use of a plurality of bands, a type of sandwich structure is produced, having substantial stiffness. The load-carrying members in the inwardly and outwardly disposed bands can be regarded as the flanges of an I-beam, while the strings of the middle bands satisfy a connecting and spacing task between the two cords to contribute to the bending stiffness of the structure.

Corrosion is prevented from arising where the thermoplastic surface of the moulded parts, preferably consisting of thermoplastic polyurethane, lies against the pipes. Additionaly, noise transmission is reduced as vibrations and other shocks are damped and partly or fully eliminated.

The mounting apparatuses can be produced from different bands, containing strings of different fibers having different characteristics. In situations where high strength is required, string fibers such as aramide, gel-spun polyethylene, PBO fibers such as Zylon, carbon fibers, boron fibers and the like can be applied. In mounting systems where large compression resistances are required, the same fiber can be combined with glass, steel or other like fibers. In sandwich constructions one can use relatively inexpensive fibers at the center, which act as spacers between the outer and inner elements. Such fibers can, for example, consist of polypropylene, polyester, or natural fibers. In order to increase the compression stiffness of the middle band a thermoplastic resin with a high proportion of fibers dispersed thereinn is not essential.

Many various thermoplastic materials can be used as the covering material. In principle almost all thermoplastic resins can be considered provided they can be fused together in a controlled manner by subsequent controlled heating.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
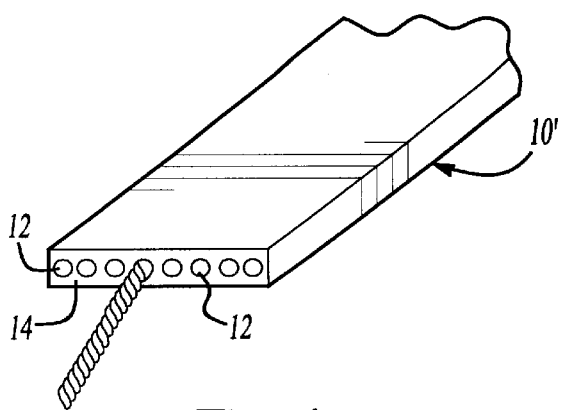
FIG. 1 is a perspective illustration of an "orbit strap" of the Roblin Company known per se, such as can be used in the present invention.

FIG. 1 shows a section from a prior art Orbit strap 10 of the Roblon company, which in this example consists of eight load-carrying strings 12, arranged alongside one another. The strings consist of aramide filaments having the shape of a cable and being covered with a thermoplastic polyurethane 14, of a rectangular cross-section.

Figure 2:
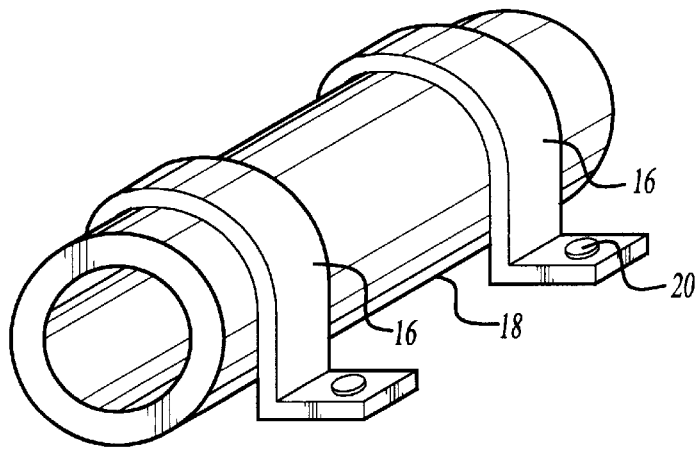
FIG. 2 is a representation of the mounting of a steel pipe with metallic hoops, such as is known in the prior art.

FIG. 2 shows a prior art mounting apparatus for steel pipes in an offshore field. The known apparatus has U-shaped steel hoops 16 which extend around the pipe 18 and are secured to the foundation by anchoring bolts 20. It is known from practice that corrosion arises to a larger degree between the steel hoops 16 and the pipe 18 in the region where the steel hoop surrounds the pipe 18.

Figure 3:
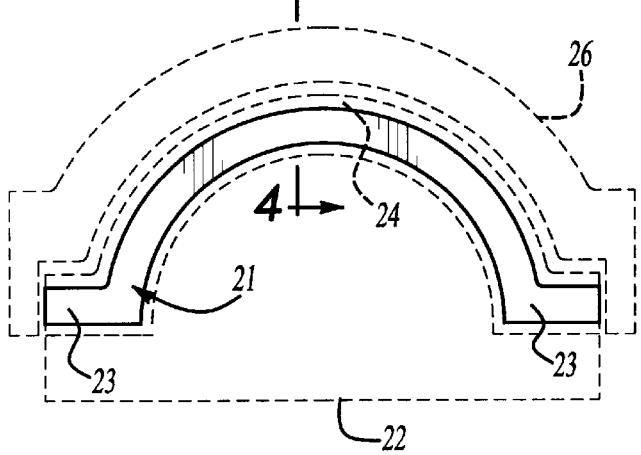
FIG. 3 is a side view of a mounting apparatus in accordance with the present invention in a mould for its manufacture.

FIG. 3 illustrates a first embodiment of a mounting apparatus 21 in accordance with the present invention having a substancially C-shape with side lugs 23. This mounting apparatus includes three bands in accordance with FIG. 1, which are laid above one another and are pressed into a constructional unit. This, for example, can take place in that the three bands are laid above one another over a mold part 22 (FIG. 3), which has side cheeks 24 to the left and right of the bands in order to ensure an aligned arrangement of the bands. Only one side cheek behind the mounting apparatus can be seen in FIG. 3. A mold part 26 is pressed downwardly in the direction of the arrow 28 in order to press together the three bands which are initially separate from one another. A heating device (not shown) ensures that the mold parts can be brought to a temperature at which a softening of the thermoplastic polyurethane covering the belts occurs. Under compression forces the jackets of the individual belts then unite into a unitary structure having a shape which is predetermined by parts 22, 26. After the cooling down of mold parts 22, 26 part 21 falls beneath the softening temperature, and can then be removed from the mold 22, 26. Part 21 retains the shape evident in FIG. 3. Alternatively, gas pressure can be sufficient to ensure homogenous fusing of the bands by enclosing them in a mold with an inflatable bladder pressing against the bands.

Figure 4:
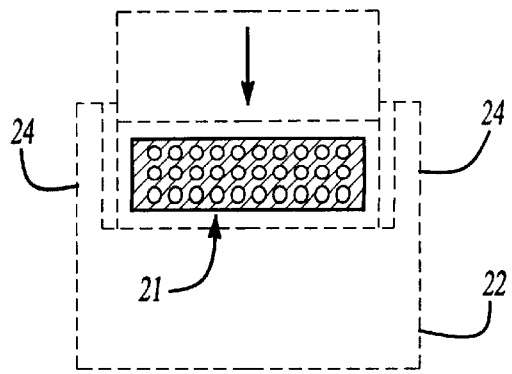
FIG. 4 is a cross-section through the mounting apparatus of FIG. 3 in accordance with the section line IV—IV of FIG. 3.

FIG. 4 shows a cross-section of the three band part 21, each band having a plurality of strings are surrounded by a unitary matrix of thermoplastic resin after removal from the mold.

Figure 5:
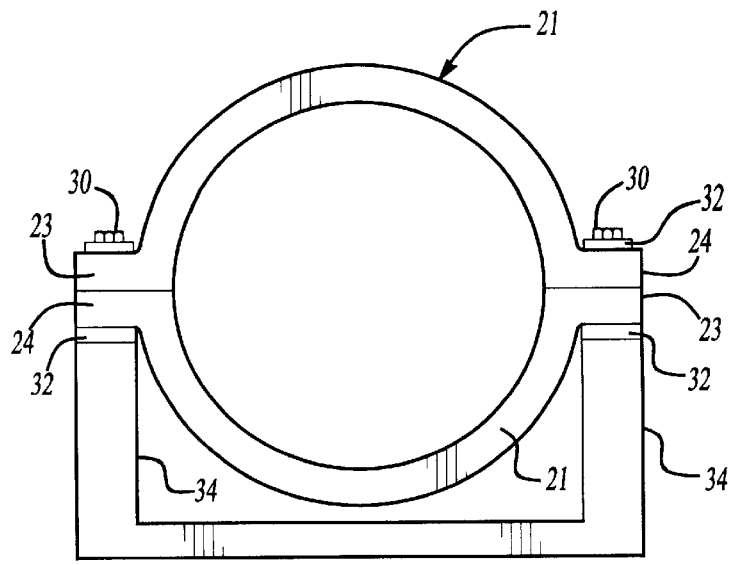
FIG. 5 is a pipe mounting apparatus assembled from two mounting apparatuses in accordance with FIG. 3.

FIG. 5 shows how two parts 21 molded in accordance with FIG. 3 can be laid against one another in order to secure a pipe (not shown). The side lugs 23, of the two mold parts 21, which represent a component of the anchoring device, are secured to posts 34 of a foundation 35. In this manner the position of the pipe is secured.

Figure 6:
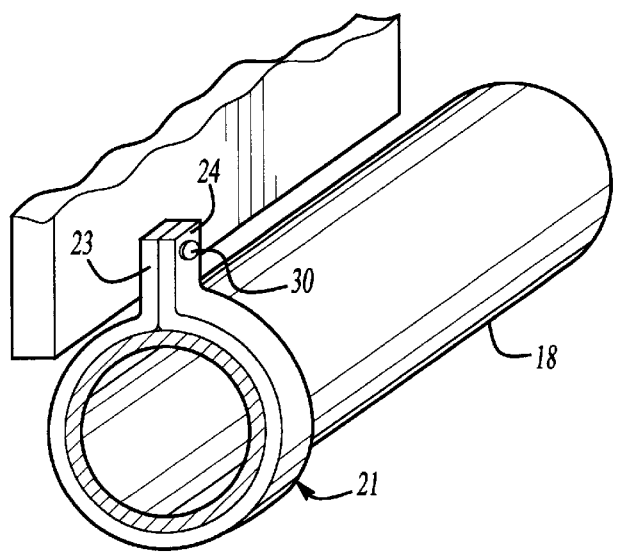
FIG. 6 is an alternative pipe mounting apparatus for the suspended attachment of a pipe to a carrying structure.

FIG. 6 shows an alternative shape of the mounting apparatus 21. The structure consists of three bands arranged above one another and placed around a corresponding mandrel in a circular mold part 21. The ends of the bands being bent radially outwardly away from the center of the circular part to form lugs 23, 24. A pipe 18 can then be suspended from the structure 35 by a mounting bolt 30, which extends through the lugs formed by the radially outwardly bent parts of the straps.

Figure 7:
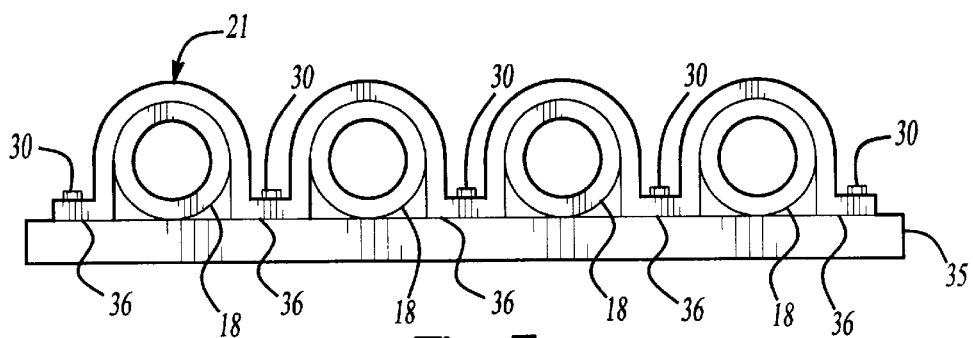
FIG. 7 is a mounting apparatus in accordance with the invention of a plurality of pipes arranged alongside one another on a foundation.

FIG. 7 shows that the mounting apparatus can also have the form of a plurality of U-shaped hoops 21, which are arranged alongside and merge into one another. The mounting apparatus can be secured at the points 36 to a foundation 35 by such means as bolts 30 and pressure-distributing washers (not shown) so that several pipes 18 can be arranged alongside one another.

It is particularly favorable that a whole multiplicity of different mounting apparatuses in the form of molded parts 21 can be manufactured starting from the existing spectrum of straps by the cutting of corresponding lengths from a long strap 10 as a starting material. In this manner a rational manufacture of the molded parts 21 is possible, and the starting material 10 can likewise be rationally manufactured.

Figure 8:
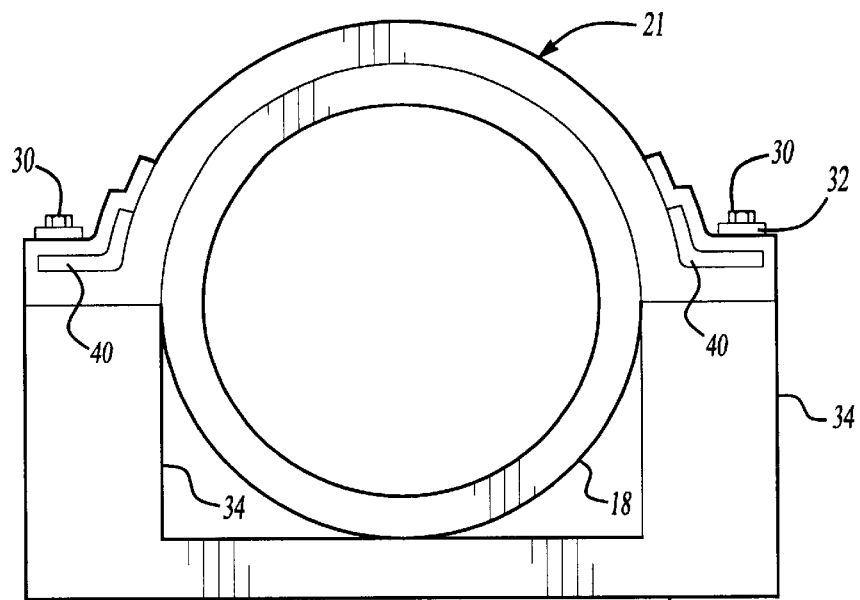
FIG. 8 is a representation of a mounting apparatus with a special anchoring device.

FIG. 8 shows the integration of a metal plate 40 into the mounting apparatus 21, so that this plate is at least substantially closed on all sides to prevent corrosion. The steel plate produces a stiffened region of the structure for mounting to a corresponding foundation 35. In order to enclose the metal plate, the lower belt 10 is placed over the metal plate and secured to the band 10 at the upper side of the mounting apparatus.

Figure 9:
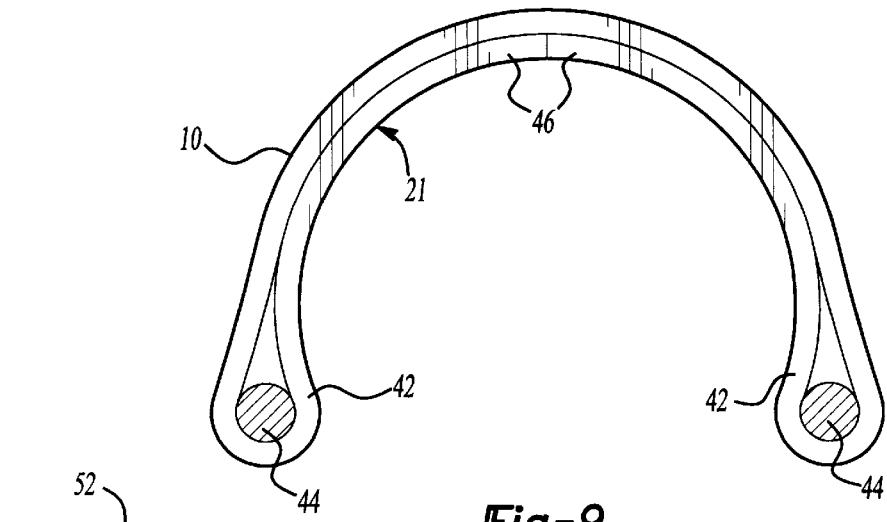
FIG. 9 is an alternative mounting apparatus in accordance with the invention in the form of a U-shaped hoop with loops for the anchoring to a base structure or foundation.

FIG. 9 shows an alternative type of anchoring in which the bands are formed into a loop 42. The loop 42 can then be secured, for example via a thoroughgoing bar 44, to a foundation thereby surrounding the pipe. The ends 46 of the bands are preferably arranged remote from the loops 42 in order to achieve the maximum strength of the loops 42.

In these examples mounting apparatus for the attachment of pipes 18 are shown. However, no restriction to the mounting of pipes is intended, since the mounting apparatus can also be used for the mounting of differently designed articles, provided that corresponding molds are produced in order to produce correspondingly shaped molded parts from the bands.

Even complicated mold parts can be produced by laying different lengths of the bands on one another in order to realize the corresponding shape. Since the thermoplastic covering becomes soft on heating, it is also possible to achieve a particular adaptation to the surface of the mold. For example only, a grooved surface with the mounting apparatus having a complementary grooved surface after its removal from the mold.

Even though in these embodiments three bands are placed together in or under to achieve the finished structure of the mounting apparatus, one skilled in the art will recognize that any number of bands can naturally also be used in order to produce the mounting apparatus. For example, bands which form the middle layers of the finished structure can also be used, which consist of fiber materials which are less string than the strings in the outer layers, and indeed without having to fear considerable penalties in the strength and bending strength of the finished mounting apparatus. It is also not necessary for all the strings or one band to consist of the same material. It is entirely possible to use different materials here in order to meet differing requirements. Thus, some of the strings can consist of a layer of favorably priced fibers, which normally have a lower strength. Such strings satisfy the function of spacers rather than the function of load carrying members.

Figure 10:
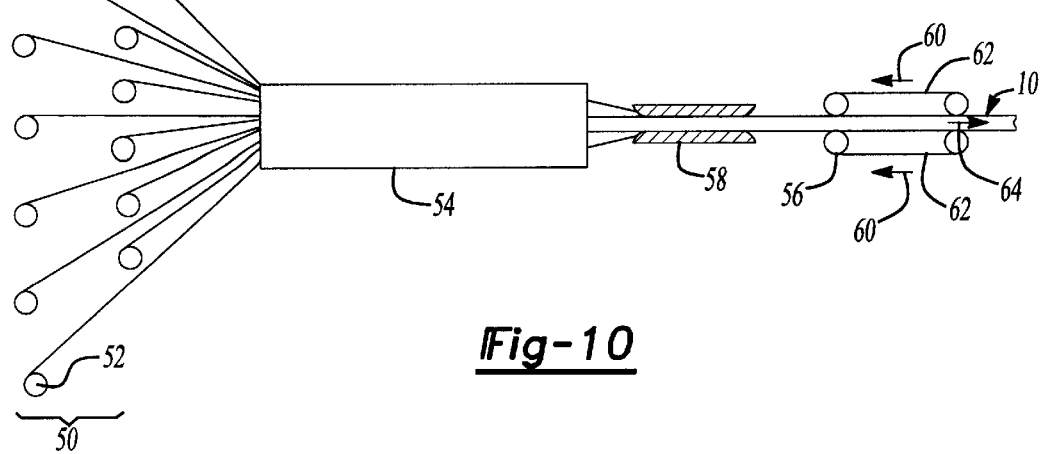
FIG. 10 illustrates the manufacture of a band structure for the present invention.

FIG. 10 illustrates an apparatus for the manufacture of a band having twelve strips each in the form of a multi-ply or corded yarn. The material can be glass, aramide, PBO, Vectran, or other high performance fibers. The yarns are first coated with a thermoplastic resin in a cross-head extruder (not shown) and wound onto large reels 52 of a creel 50. The thermoplastic resin used can be of any known type, as long as it can be processed in a extruder. The outside structure from the plied yarns mentioned above ensures mechanical cohesion between the yarns and the thermoplastic resin. In the example shown, twelve coated yarns are used and are each wound onto a respective reel 52 of the creel 50. The coated yarns are drawn from the reels and led through a hot air oven 54, where the temperature is such that it corresponds to the softening temperature of the plastic. At the outgoing side of the oven 54, there is placed a die 56 which corresponds to the size and profile of the resulting band 10. The die 56 has a size which ensures a good pressure in the material which is pulled through the die. A caterpillar pulling arrangement 58 (a caterpuller) is placed at an appropriate distance after the die. This arrangement comprises two recirculating bands 62 which move in the direction as shown by the arrows 60. The arrangement 58 pulls the whole band and thereby the coated yarns through the process line. After the caterpuller 58 the band 10 can be wound onto a drum for storage or can be processed immediately, while still warm, into a mounting structure of mounting apparatus in accordance with the present invention.

For example only, the twelve plied aramid yarns can each consist of 3340×1×3 dtex 110s-65 coated with polypropylene thermoplastic resin. The hot air oven can have a temperature of 220° C. The die 56 can have a rectangular aperture of 3 mm×21 mm and the resulting band has a rectangular cross section of the same size.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A pipe mounting apparatus, comprising:
   a first shaped band having a plurality of load-carrying filaments encapsulated in a cured thermoplastic matrix;
   a second band shaped to conform with said first band in contiguous relation having a plurality of load carrying filaments encapsulated in a cured thermoplastic matrix; and
   said cured thermoplastic matrices of said first and second bands heat fused together to form a reinforced unitary pipe mounting apparatus.

2. The pipe mounting apparatus according to claim 1, wherein each of said strings have a plurality of load-carrying filaments.

3. The pipe mounting apparatus according to claim 2, further comprising spacers arranged between said strings, said spacers secured to said strings by said thermoplastic coating.

4. The pipe mounting apparatus according to claim 3, wherein said spacers are low strength filaments having a lower strength than said plurality of load-carrying filaments.

5. The pipe mounting apparatus according to claim 3, wherein said spacers are selected from the group consisting of polypropylene, polyester, or natural fibers.

6. The pipe mounting apparatus according to claim 1, wherein said filaments are selected from the group consisting of aramide fibers, gel-spun polyethylene fibers, or PBC fibers.

7. The pipe mounting apparatus according to claim 6, wherein said filaments are twisted together.

8. The pipe mounting apparatus according to claim 1, wherein said thermoplastic coating is adjacent the pipe.

9. The pipe mounting apparatus according to claim 1, further comprising a central band disposed between said first and said second band.

10. The pipe mounting apparatus according to claim 9, wherein said central band includes low strength filaments having a lower strength than a plurality of load-carrying filaments.

11. The pipe mounting apparatus according to claim 10, wherein said low strength filaments are selected from the group consisting of polypropylene, polyester, or natural fibers.

12. The pipe mounting apparatus according to claim 11, wherein said central band comprises one or more bands.

13. The pipe mounting apparatus according to claim 1, wherein said bands are molded to the shape of the pipe to be secured.

14. The pipe mounting apparatus according to claim 1, further comprising a reinforcing element molded into said band.

15. The pipe mounting apparatus according to claim 14, wherein said reinforcing element is a metal plate substantially encapsulated by said thermoplastic coating.

16. The pipe mounting apparatus according to claim 14, wherein said reinforcing element is a plurality of strings laid substantially transverse to said bands, wherein said transverse strings substantially encapsulated by said thermoplastic coating.

17. The pipe mounting apparatus according to claim 1, wherein an end of said band is formed into a loop.

18. The pipe mounting apparatus according to claim 1, wherein said bands are formed into a plurality of adjacent U-shaped hoops.

19. A method for manufacturing a pipe mounting apparatus, said method comprising the steps of:
   heating a plurality of bands, each of said bands having a plurality of load-carrying filaments and a cured thermoplastic resin covering said filaments, wherein said heating softens said thermoplastic resin;
   pressing said bands together in a mold while said thermoplastic resin is soft from said heating, said thermoplastic resin of each band merging to form a substantially unitary thermoplastic resin covering encasing said plurality of bands;
   cooling said thermoplastic resin; and
   removing said band from said mold.

* * * * *

UNITED STATES PATENT AND TRADEMARK OFFICE
CERTIFICATE OF CORRECTION

PATENT NO.   : 6,098,932
DATED        : August 8, 2000
INVENTOR(S)  : John Olesen Page 1 of 1

It is certified that error appears in the above-identified patent and that said Letters Patent is hereby corrected as shown below:

Column 7,
Line 51, claim 2, line 1, delete "1" and substitute therefor -- 16--
Line 56, (claim 3, line 4);

Column 8,
Line 11, (claim 8, line 2); line 33, (claim 15 line 2); and line 38, (claim 16, line 5) delete "coating" and substitute therefor -- matrix --

Signed and Sealed this

Eighteenth Day of September, 2001

Attest:

NICHOLAS P. GODICI
Attesting Officer
Acting Director of the United States Patent and Trademark Office